US012790446B2

(12) United States Patent
Mesic et al.

(10) Patent No.: US 12,790,446 B2
(45) Date of Patent: Nov. 10, 2026

(54) METHOD FOR PRODUCING POWDERED CELLULOSE

(71) Applicant: SÖDRA SKOGSÄGARNA EKONOMISK FÖRENING, Växjö (SE)

(72) Inventors: Narcis Mesic, Varberg (SE); Jim Parkås, Varberg (SE); Fredrik Solhage, Borås (SE)

(73) Assignee: SÖDRA SKOGSÄGARNA EKONOMISK FÖRENING, Växjö (SE)

( * ) Notice: Subject to any disclaimer, the term of this patent is extended or adjusted under 35 U.S.C. 154(b) by 573 days.

(21) Appl. No.: 18/261,708

(22) PCT Filed: Jan. 19, 2022

(86) PCT No.: PCT/EP2022/051133
§ 371 (c)(1),
(2) Date: Jul. 17, 2023

(87) PCT Pub. No.: WO2022/157196
PCT Pub. Date: Jul. 28, 2022

(65) Prior Publication Data

US 2024/0110016 A1 Apr. 4, 2024

(30) Foreign Application Priority Data

Jan. 20, 2021 (SE) .................................... 2150060-8

(51) Int. Cl.
*C08H 8/00* (2010.01)
*C08B 15/08* (2006.01)
*C08J 3/12* (2006.01)

(52) U.S. Cl.
CPC ............... *C08H 8/00* (2013.01); *C08B 15/08* (2013.01); *C08J 3/12* (2013.01); *C08J 2301/02* (2013.01)

(58) Field of Classification Search
CPC .. C08H 8/00; C08B 15/08; C08B 1/00; C08B 11/12; C08B 5/00; C08J 3/12;
(Continued)

(56) References Cited

U.S. PATENT DOCUMENTS

| | | | |
|---|---|---|---|
| 2,663,907 | A | 12/1953 | Downing et al. |
| 4,307,121 | A | 12/1981 | Thompson |

(Continued)

FOREIGN PATENT DOCUMENTS

| | | | |
|---|---|---|---|
| DE | 14 11 892 | A1 | 10/1968 |
| JP | H08104650 | A | 4/1996 |

(Continued)

OTHER PUBLICATIONS

Zhang et al., "Preparation of cellulose nanofiber from softwood pulp by ball milling" Cellulose 22, Feb. 2015, 1729-1741 (Year: 2015).*

(Continued)

*Primary Examiner* — Richard M Rump
*Assistant Examiner* — Abdul-Rahman Yusuf Waleed Smari
(74) *Attorney, Agent, or Firm* — Christensen O'Connor Johnson Kindness PLLC

(57) ABSTRACT

The present invention relates to a method for producing powdered cellulose. The method comprises the steps of providing dry pulp starting material, heat treating the dry pulp starting material to a temperature of 100-200° C., for less than 1 hour, and refining the heat-treated dry pulp starting material to particles having d97<500 μm.

16 Claims, 1 Drawing Sheet

(58) Field of Classification Search
CPC ........ C08J 2301/02; C08L 1/02; D21C 9/007; D21D 1/20; D21D 1/32; A23L 29/262; A23L 33/24; A61K 47/38; D21B 1/066
See application file for complete search history.

(56) References Cited

U.S. PATENT DOCUMENTS

| | | | | |
|---|---|---|---|---|
| 5,026,569 | A | 6/1991 | Forand | |
| 6,884,883 | B1 | 4/2005 | Shima et al. | |
| 10,131,715 | B2 * | 11/2018 | Hepworth | C09D 7/65 |
| 10,246,522 | B2 * | 4/2019 | Hepworth | C09D 7/65 |
| 2009/0306364 | A1 | 12/2009 | Wolfgang et al. | |
| 2011/0100571 | A1 | 5/2011 | Matsushita | |
| 2019/0136454 | A1 | 5/2019 | Lundberg | |
| 2022/0106459 | A1 * | 4/2022 | Queirós Dourado | C08L 1/02 |

FOREIGN PATENT DOCUMENTS

| | | | |
|---|---|---|---|
| JP | 2017-61614 | A | 3/2017 |
| JP | 2017-66257 | A | 4/2017 |
| JP | 2017-131217 | A | 8/2017 |
| JP | 2018-184596 | A | 11/2018 |

OTHER PUBLICATIONS

Lee et al., "Mechanical pretreatment of cellulose pulp to produce cellulose nanofibrils using a dry grinding method" Industrial Crops & Products 104, May 2017, 179-187 (Year: 2017).*

Office Action and Search Report mailed Oct. 13, 2021, issued in corresponding Swedish Application No. Patent application No. 2150060-8, filed Jan. 20, 2021, 9 pages.

Korpela, A., and H. Orelma, "Manufacture of Fine Cellulose Powder From Chemically Crosslinked Kraft Pulp Sheets Using Dry Milling," Powder Technology 361, pp. 642-650, available Nov. 2019.

Mayer-Laigle, C., et al., "Comminution of Dry Lignocellulosic Biomass: Part II. Technologies, Improvement of Milling Performances and Security Issues," Bioengineering 5(3):50, Jun. 2018, 17 pages.

International Search Report and Written Opinion mailed May 19, 2022, issued in corresponding International Patent Application No. PCT/EP2022/051133, filed Jan. 19, 2022, 14 pages.

Second Written Opinion mailed Dec. 14, 2022, issued in corresponding International Patent Application No. PCT/EP2022/051133, filed Jan. 19, 2022, 7 pages.

* cited by examiner

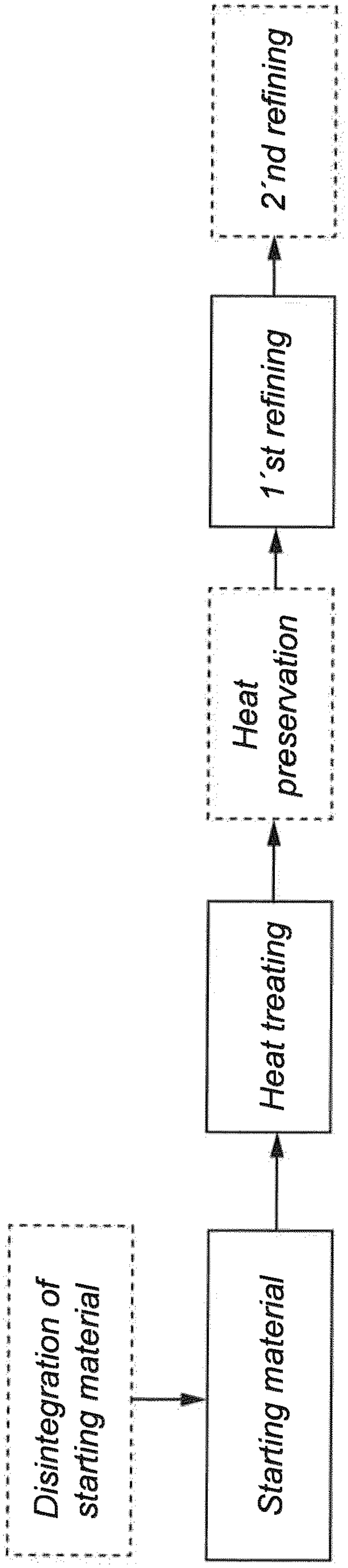
Disintegration of starting material
Starting material
Heat treating
Heat preservation
1´st refining
2´nd refining

METHOD FOR PRODUCING POWDERED CELLULOSE

FIELD OF THE INVENTION

The present disclosure relates to a new method for producing powdered cellulose and a product obtained by the method. The method includes the steps of heat treating a dry pulp starting material and refining the heat-treated dry pulp starting material to fine particles.

BACKGROUND

Powdered cellulose, also known as cellulose powder, is cellulose that has been processed into powder primarily by mechanical procedures such as grinding.

The interest for powdered cellulose has in recent years increased due to its unique chemical and physical properties when combined with water. It has for example no specific taste or odor which makes it suitable as an excipient in drugs or as additive in food or feed to achieve an increase in bulk and fiber content. Moreover, its hydrophilic properties allow cellulose to bind and mix easily with water, why it is often added to increase the fiber content of drinks and other liquid items.

Powdered cellulose and microcrystalline cellulose (MCC) are both grouped in the European food additive number E460. However, there are some major differences between the two of them. One difference is the manufacturing process; powdered cellulose is made by purification of natural wood pulp to obtain alpha-cellulose and subsequent mechanical disintegration while MCC is produced by hydrolysis of alpha-cellulose to improve its crystallinity. The average molecular weight of powdered cellulose is in general also higher than that of MCC.

Although cellulose may be found in most plant matter, one of the most economical sources of industrial cellulose is wood pulp. Various methods for obtaining powdered cellulose of different grades have been described in the state of art.

WO17197384 discloses a manufacturing process for dry processed cellulose fibers for papermaking. The purpose is to lower the density of a paperboard. In the process, dry cellulose fibers are introduced into an attritor device and comminuted to create smaller cellulose particles. The collected cellulose particles have a particle size distribution with 95% of the particles between 20 μm and 500 μm.

U.S. Pat. No. 4,415,124 discloses a method to produce micropowders from cellulose ethers or cellulose. This method comprises the steps of consolidating a cellulose ether or a cellulose having a fine-fiber structure in a jet mill to a powder and grinding the consolidated material until a grain size distribution with at least 90% by weight of less than 125 μm is obtained.

The present inventive concept seeks to provide a method for producing powdered cellulose of higher purity and with a higher production rate than methods known in the art.

SUMMARY

An object of the disclosure is to provide a method for producing powdered cellulose and a product obtained by the method. The method includes the steps of heat treating a dry pulp starting material and refining the heat-treated dry pulp starting material to fine particles. The method presents advantages in terms of a high-quality powdered cellulose, which may be obtained with low energy consumption and fast production rate.

According to a first aspect of the disclosure, these and other objects are achieved, in full or at least in part, by a method for producing powdered cellulose. The method comprises the steps of:

a) providing dry pulp starting material,
b) heat treating the dry pulp starting material to at a temperature of 100-250° C., for less than 1 hour, and
c) refining the heat-treated dry pulp starting material to particles having d97<500 μm.

The dry pulp starting material may be in the form of sheet pulp or fluff pulp. In particular, the proposed method is well suited to implement in a pulp mill and may not have to rely on equipment for producing and handling pulp rolls or expensive equipment for heating and simultaneously compressing the pulp substrate. However, it is fully possible to implement the method outside a pulp mill.

Heating treating by means of hot and dry air has many benefits. It is a simple, fast, reliable, and cost efficient heating method which results in more uniform heating than by means of heated rolls for example. Furthermore, since heat treating in hot air makes it is easy to control the temperature of the pulp, the risk of overdrying the pulp is mitigated.

In normal pulp production, heat treatments of pulp are associated with overdrying and are therefore carefully avoided. Examples of negative effects of overdrying are increased energy costs and possible reduced quality, such as discoloration. Overdrying may be achieved in a pulp drying machine or when using a flash drying unit.

However, the inventors of the present invention have surprisingly found that heat treatment of pulp may be beneficial in the production of powdered cellulose in terms of improved production rate compared to conventional processes for making powdered cellulose. This positive effect may be related to a possible embrittlement of the pulp. Moreover, the method according to the invention potentially has the benefits of low risk of loss in brightness and low microbial content of the powdered cellulose. Furthermore, the present invention has the benefit that it may be used on various dry pulp starting materials, derived from both hardwood and softwood. Non-limiting examples of hardwoods are birch, beech, aspen, acacia, and eucalyptus. Non-limiting examples of softwoods are spruce, pine, and larch. Additionally, the dry pulp starting material may be manufactured by various processes. Some examples of dry pulp starting materials are:

According to an embodiment, the dry pulp starting material comprises softwood Kraft paper pulp.

According to an embodiment, the dry pulp starting material comprises hardwood Kraft paper pulp.

According to an embodiment, the dry pulp starting material comprises hardwood sulphite pulp.

According to an embodiment, the dry pulp starting material comprises softwood sulphite pulp.

According to an embodiment, the dry pulp starting material comprises mechanical pulp (MP), and preferably chemithermomechanical pulp (CTMP). Mechanical pulp may comprise CTMP and thermomechanical pulp (TMP).

According to an embodiment, the dry pulp starting material comprises hardwood dissolving pulp.

According to an embodiment, the dry pulp starting material comprises softwood dissolving pulp.

According to an embodiment, the dry pulp starting material comprises bamboo.

According to an embodiment, the dry pulp starting material comprises bagasse.

According to an embodiment, the dry pulp starting material comprises softwood Kraft paper pulp, hardwood Kraft paper pulp, hardwood sulphite pulp, softwood sulphite pulp, mechanical pulp (MP), softwood dissolving pulp, hardwood dissolving pulp, or mixtures thereof.

According to an embodiment, the dry pulp starting material comprises flash-dried pulp. The flash-dried pulp may preferably be softwood Kraft paper pulp. Flash-drying is beneficial since it potentially makes the pulp brittle.

According to an embodiment, the dry pulp starting material comprises dissolving pulp. The dissolving pulp may preferably derive from a Kraft process. Dissolving pulp has the benefit of being more heat resistant than other pulp materials in general.

In order to achieve uniform heat treatment of the dry pulp starting material, step a) may further include a step of disintegration of the dry pulp starting material. Disintegration may in this context be synonym with pre-shredding. Hence, the dry pulp starting material used herein may for example be disintegrated flash dried pulp or dry pulp sheet, shredded or cut into cm or mm pieces. Flash dried pulp may be disintegrated in a hammer mill before step b).

As mentioned above, the temperature of the heat treatment in step b) is selected to avoid overdrying of the pulp and still get low microbe content. The temperature of the heat treatment is therefore carefully selected. A high heat treating temperature is beneficial in that it reduces the time needed for refining (such as milling) without negative impact on the brightness. The heat treating may for example be performed at a temperature of at least 110° C., at least 120° C., or at least 130° C. The time for the heat treatment in step b) is of importance for the same reasons. According to an embodiment, the heat treatment of step b) is performed for at least 5 minutes, at least 10 minutes, or at least 15 minutes.

In one embodiment, the heat treatment of step b) is performed for at least 1 minute. A shorter time period of heat treatment may in particular be favorable for a flash dried starting material. For applications not sensitive to color, such as technical applications, high temperatures and longer treatment times within the given range may be used. Non-limiting examples of technical applications are paint, paper manufacturing, lacquer, filter applications, coatings, and filter aids. For applications where brightness is important shorter times and/or lower temperatures within the given range may be used. The brightness of the powdered cellulose may thus be correlated to the time and/or the temperature of the heat treatment.

The heat treatment may be employed in normal atmosphere, i.e. with presence of oxygen, or in inert atmosphere, e.g. by means of nitrogen or carbon dioxide. An inert atmosphere means a chemically inactive atmosphere.

According to an embodiment, the heat treating of step b) is performed in nitrogen ($N_2$) atmosphere.

According to an embodiment, the heat treating of step b) is performed in carbon dioxide ($CO_2$) atmosphere.

By using inert atmosphere, the decrease in brightness loss is potentially reduced compared to normal atmosphere. Furthermore, inert atmosphere for heat treatment decreases the risk of self-ignition of the pulp. These benefits may in particular have importance when high temperatures and/or long heat treatment times are used.

According to an embodiment, the heat treating of step b) is performed at a temperature of no more than 200° C., no more than 190° C., no more than 180° C., or no more than 170° C.

According to an embodiment, the heat treating of step b) is performed at a temperature of no more than 250° C., no more than 225° C., no more than 200° C., no more than 190, or no more than 180° C. It is preferable to use inert atmosphere when heat treating the pulp to a temperature above 200° C. in order to avoid self-ignition.

The heat treatment of step b) may be performed for less than 50 min, less than 40 min, or less than 30 min.

The changes of brightness of the pulp during step b) may be measured and controlled by the PC-number.

According to an embodiment, step b) is performed to a PC-number below 5, preferably below 1. According to an embodiment, step b) is performed to a PC-number below 3. According to an embodiment, step b) is performed to a PC-number below 0.1.

The method according to the invention thus contributes to a powdered cellulose having high brightness, recognizable from that a low post color number, may be obtained.

Step c) of the invention relates to refining of the heat-treated pulp. In this step, the pulp is milled and sieved to powder of certain particle size. The degree of refining is in general a balance between energy consumption and particle size. Productions leading to small particles, e.g. a small and narrow size distributions, often requires more energy and longer production rate than production of larger particles. It is though often preferred that the powdered cellulose has a small and narrow size distribution. In many applications, such as food, feed, technical, and pharmaceutical, it is an advantage if the d97 of the cellulose powder is below 500 μm to ensure smooth and even mixing with other components of a formulation, i.e. to get the right mouthfeel and to get the right viscosity of blends. In some other applications, the d97 needs to be even smaller to ensure even surfaces.

According to an embodiment, refining of step c) is performed to a particle size of d97<300 μm, preferably to a particle size of d97<200 μm, more preferably to a particle size of d97<100 μm.

Milling may be carried out using conventional milling processes, which include hammer milling, ball milling, stone milling (which is a form of attrition milling), impact milling, and knife milling. Stated differently, step c) is a milling process conducted by a mill selected from the group consisting of: a hammer mill, a ball mill, a stone mill, an impact mill and a knife mill.

According to an embodiment, the refining of step c) is performed in at least one of a hammer mill, a ball mill, a stone mill, an impact mill, and a knife mill.

According to an embodiment, the mill is combined with a sieve to control the size of the powdered cellulose. The particle size of the powder may thus be adjusted by means of a downstream sieve of selection. The sieve may be comprised in the mentioned mill device. Hereby, the refining step c) may comprise both milling and sieving.

The refining step c) may be performed on hot heat-treated pulp or cold heat-treated pulp. In the former alternative, the heat-treated pulp is not allowed to cool before the step of refining. Hereby, the heat-treated pulp is subjected to refining without any intermediate cooling. This could be advantageous in terms of improved production rate. In the later alternative, the heat-treated pulp is cooled, e.g. by passive cooling down to room temperature, before it is refined. This is advantageous since it allows some time to pass between step b) and step c) is carried out, e.g. hours, days, or weeks. Hereby, step c) may be carried out at a different location than step c).

According to an embodiment, the method further comprises a step of heat preservation of the heat-treated dry pulp starting material until the refining of step c).

According to an embodiment, the refining of step c) is performed at a pressure below atmospheric pressure. This means that the pulp is forced through the apparatus by means of air evacuation. Some positive effects of using a pressure below atmospheric pressure in the refining are that bridging or blocking is avoided in the sieve. Non-limiting examples of pressures below atmospheric pressures to be used are at least 0.3 kPa, at least 0.6 kPa, or at least 0.8 kPa.

In order to achieve a small particle size, it may be advantageous to refine the heat-treated pulp in two steps, a first refining and a second refining. The purpose of the second refining is to further decrease the size of the particles provided in the first refining. Hence, the first refining provides particles of larger diameter and the refining provides particles of smaller diameter.

According to an embodiment, the refining of step c) is performed in at least two refining steps, comprising a first refining to a particle size of d97<2000 μm, and a second refining to a particle size of d97<400 μm. Stated differently, the step of refining may be divided into a first step of refining and a second step of refining, wherein the second step of refining further decreases the particle size compared to the first refining. Hereby the particle size of the powder may be reduced to a lower level compared to only one step of refining. This may for instance be achieved by two steps of milling: pre-milling and milling. Pre-milling of the pulp is beneficial in that the production rate of the milling may be improved.

According to an embodiment, the first refining is performed in a hammer mill, an impact mill, a knife mill, or air jet mill, and the second refining is performed in a ball mill, a stone mill, an impact mill, or a knife mill.

By means of these mills the particle size of the powder at a low level is provided.

According to a second aspect of the disclosure, these and other objects are also achieved, in full or at least in part, by a product obtained by the process.

According to an embodiment, the product obtained by the process have a microbe content below 14 000 cfu/g, 12 000 cfu/g, 10 000 cfu/g, 5 000 cfu/g, 2 000 cfu/g, or 1 000 cfu/g. Microbes are in this context meant to comprise aerobes, yeasts, and molds.

The method to determine the microbe content may vary depending on what type of microbes that will be measured. For determination of aerobes the measurement may be performed according to NMKL 86:2013. For determination of yeast or molds, method NMKL 98, 4. Ed., 2005 may be used.

According to an embodiment, the product obtained by the process, have an aerobe microorganism content below 10 000 cfu/g, 5 000 cfu/g, 2 000 cfu/g, or 1 000 cfu/g. The analyze comprising incubation of the sample at 30° C. before the aerobe microorganism content is determined.

According to an embodiment, the product obtained by the process, have a yeast content below 2 000 cfu/g, 1 000 cfu/g, 500 cfu/g, or 100 cfu/g.

According to an embodiment, the product obtained by the process, have a molds content below 2 000 cfu/g, 1 000 cfu/g, 500 cfu/g, or 100 cfu/g.

According to an embodiment of this second aspect, the dry pulp starting material comprises dissolving pulp. The dissolving pulp may preferably derive from a Kraft process.

According to an embodiment of this second aspect, the dry pulp starting material comprises softwood dissolving pulp. The softwood dissolving pulp may preferably derive from a Kraft process.

According to an embodiment of this second aspect, the dry pulp starting material comprises hardwood dissolving pulp. The hardwood dissolving pulp may preferably derive from a Kraft process.

According to an embodiment of this second aspect, the dry pulp starting material comprises flash-dried pulp. The flash-dried pulp may preferably be softwood Kraft paper pulp.

According to a third aspect of the disclosure, these and other objects are also achieved, in full or at least in part, by use of the product according to the second aspect, to increase fiber content within a food product, within a feed product or within a pharmaceutic product.

In an embodiment of this third aspect, the product according to the second aspect, is used within a technical application. Non-limiting examples of technical applications are paint, paper manufacturing, lacquer, filter applications, coatings, and filter aids.

Other objectives, features and advantages of the present disclosure will appear from the following detailed description, from the attached claims, as well as from the drawings. It is noted that the disclosure relates to all possible combinations of features.

DEFINITIONS

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

The expression "dry pulp starting material", as used herein, is intended to describe pulp having a dryness of at least 85%, at least 90%, at least 95%, or at least 98%.

As used herein, the term "refining" may be interpreted as comminuting, dry-milling and/or grinding in combination with sieving and collecting a powder of defined particle size and fiber length.

The expression "heat treating", as used herein, is intended to define a process where the material is heated, in hot and dry air, at elevated temperatures and kept at this temperature for a certain time limit. Typically, the hot and dry air may have a relative humidity of less than 5%, less than 1%, less than 0.5%, or less than 0.1%. The heat treating may exclude equipment that mechanically affect the dry pulp starting material during heating, e.g. heating by heated rolls.

The term "flash dried pulp" refers to pulp which has been subjected to flash drying, i.e. a method wherein small flocks of well-squeezed wet pulp are forced to tumble in a hot air flow while being dried. This means that the fiber mass is supplied into a flow of hot drying air in a disintegrated condition.

The term "dissolving pulp" refers to bleached wood pulp, which has been manufactured from the sulfite process or the kraft process with additional process steps to remove hemicelluloses. This pulp is manufactured for uses that require a high chemical purity, and particularly low hemicellulose content.

Paper pulp is the raw material for paper manufacture. Both hardwoods and softwoods may be used to make paper pulp.

Wood pulps may be classified into two general groups, mechanical and chemical.

The kraft process, also known as kraft pulping or sulfate process, is a process for the manufacture of pulp that employs a solution of caustic soda and sodium sulfide as the liquor in which the pulpwood is cooked to release the fibers. The kraft process differs from the sulfite process in that the cooking liquor is alkaline.

The sulfite process is, similar to the kraft process, a chemical process for manufacture of pulp.

TMP (thermomechanical pulping) is a mechanical pulping process using heat and mechanical energy to transform the wood into pulp.

CTMP (chemi-thermomechanical pulping) is a mechanical pulping process using an additional impregnation step using chemicals prior to the application of heat and mechanical energy.

As used herein, the term "Post color (PC) number" defines the brightness reversion tendency, i.e. the loss in brightness. The PC-number is the difference between the ratios of the light absorption coefficient (k) and the light scattering coefficient (s).

$$\text{PC-number}=100\times[(k/s)_t-(k/s)_{t=0}]$$

The ratio may be approximated from the reflectance using the Kubelka-Munk relation:

$$k/s=(1-R_\infty)^2/(2R_\infty).$$

$R_\infty$ is the measured diffuse reflectance at 457 nm.

As used herein, the term "d97" defines a particle diameter value where 97% of the sample is smaller than that value.

As used herein, the term "comprising" and variations of that term are not intended to exclude other additives, components, integers, or steps.

BRIEF DESCRIPTION OF THE DRAWINGS

The disclosure will be described in more detail with reference to the appended schematic drawings, which show an example of a presently preferred embodiment of the disclosure.

FIG. 1 shows a process diagram of a method as defined herein.

DETAILED DESCRIPTION

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

FIG. 1 shows a process diagram of a method for producing powdered cellulose. In a first step starting material in the form of dry pulp is provided. The starting material may be any one of flash dried pulp or sheet pulp, torn into pieces and/or defibrillated in a hammer mill. The starting material may thus be subjected to disintegration. Suitable pulp materials include, but are not limited to, hardwood Kraft paper pulp, softwood Kraft paper pulp, hardwood sulphite pulp, softwood sulphite pulp, mechanical pulp, hardwood dissolving pulp, and softwood dissolving pulp, manufactured with methods known for a person skilled in the art. The starting material preferably has a dry content of at least 85%.

In the next step, the pulp is subjected to heat treatment, which means the pulp is heated to an elevated temperature for a certain period of time. It should be noted that the starting material may have an elevated temperature already when the heat treatment starts. Suitable time periods are at least 5 minutes and up to 1 h. The heat treatment may cause an embrittlement of the pulp which is beneficial in the refining step.

After the heat treatment, the heat-treated pulp is subjected to refining. In this step the heat-treated pulp is dry-milled and sieved to obtain a fine powder. The heat-treated pulp may be cooled down to room temperature prior to refining or it can be refined without any intermediate cooling, i.e. in hot state, directly after the heat treatment. After the step of refining the powder may optionally be subjected to a second step of refining to further decrease the particle size of the powdered cellulose. Where the heat-treated pulp is subjected to a single step of refining suitable mills are a hammer mill, a ball mill, a stone mill, an impact mill, a knife mill. Where the heat-treated pulp is subjected to two steps of refining, any combination of a hammer mill, a ball mill, a stone mill, an impact mill, a knife mill may be used. Where the heat-treated pulp is subjected to two steps of refining, preferably the first refining is performed in a hammer mill, an impact mill, a knife mill or air jet mill, and the second refining is performed in a ball mill, a stone mill, an impact mill, or a knife mill.

The present disclosure is further illustrated by the following non-limiting examples.

Example 1—Effect of Two Refining Steps, No Heat Treatment

Different types of commercial cellulose samples were first defiberized in a hammer mill (Kamas, 2 mm sieve, 0.3 kPa below atmospheric pressure). The selected samples were:

- a hardwood dissolving pulp (Kraft process) called (HW-D)
- a hardwood Kraft paper pulp called (HW-P-1)
- a flash-dried softwood Kraft paper pulp called (SW-P-Flash)
- a softwood Kraft paper pulp dried on a drying machine called (SW-P-DM)
- a hardwood Kraft paper pulp called (HW-P-2)

The average length-weighted fiber length of the hammer mill defiberized samples may be seen in Table 1. The analysis was performed according to a modified method described below.

Average Fiber Length Analysis and Particle Size Distribution

The average fiber length analysis was performed using a L&W Fiber Tester Plus essentially according to ISO 16065-2 but with some modifications to allow for detections of smaller particles than in the standard method (fines limit of 0.2 mm). The modifications were:

- limit for fines changed from 0.2 mm to 0 mm
- the program is run without form factor limit
- length intervals for the fiber length distribution were set to 0-0.1 mm, 0.2-0.3 mm, and so on up to 1 mm, with the last fraction 1-7.5 mm.

Also, a common but very different analysis was performed, namely, air-jet sieving. This was done by sieving all samples using sieve sizes of 25, 75, 100, 200, and 400 μm in a Hosokawa Alpine LC200. The weights of all material that remained on the sieves was recorded together with d97 for most samples.

TABLE 1

Length-weighted average fiber length of the samples defiberized in a hammer mill prior to further treatment in a knife mill.

| Sample | Average fiber length (μm) |
|---|---|
| (HW-D) | 599 |
| (HW-P-1) | 746 |
| (SW-P-Flash) | 2031 |
| (SW-P-DM) | 1286 |
| (HW-P-2) | 658 |

To demonstrate the inherent differences in response to dry milling of different cellulose fiber sources, the hammer-milled samples were further treated in a knife mill (rotor diameter 130 mm with three knifes, 1430 rpm, motor effect 1.5 kW, rotor-stator gap=0.3 mm) at a feed rate of 600 g/h, according to the parameter sieve size. All samples were produced using a pressure below atmospheric pressure. Without using a pressure below atmospheric pressure in the outlet, severe bridging and blocking was observed. No major effect of increasing the pressure below atmospheric pressure to 0.6 kPa was seen. Larger sieve size increases the production rate and the average fiber length.

The production rate was determined as the weight of the collected powder that has passed through the mill during the trial (5 minutes). Also, the powder was analyzed for particle size using the methods described (Fiber Tester Plus and air-jet sieve). The fiber lengths given are length-weighted averages.

TABLE 2

Knife-mill milling of different samples defiberized by a hammer mill (see Table 1).

| Sample | Sieve size (μm) | Production rate (g/h) | Fiber length (μm) | $d_{97}$ (μm) |
|---|---|---|---|---|
| (HW-D) | 100 | 346 | 261 | 82 |
| (HW-P-1) | 100 | 395 | 296 | 81 |
| (SW-P-Flash) | 100 | 472 | 275 | 79 |
| (SW-P-DM) | 100 | 410 | 263 | 77 |
| (HW-P-2) | 100 | 284 | 262 | 81 |
| (HW-D) | 80 | 269 | 171 | 45 |
| (HW-P-1) | 80 | 349 | 186 | 45 |
| (SW-P-Flash) | 80 | 398 | 220 | n.a. |
| (SW-P-DM) | 80 | 307 | 187 | 49 |
| (HW-P-2) | 80 | 230 | 182 | 43 |

The results show that flash-dried pulp gives significantly higher production rate (+15%), at a very similar average fiber length (+4.5%), compared to softwood pulp dried on a drying machine.

Surprisingly, the highest production rate was observed with pulp with the largest average fiber length.

Without using a pressure below atmospheric pressure in the outlet, severe bridging and blocking was observed. No major effect of increasing the pressure below atmospheric pressure to 0.6 kPa was seen. Larger sieve size increases the production rate and the average fiber length.

These examples show how a knife mill may be used as a classifier or a second-stage milling after a prior knife mill pass. Quite naturally, a finer screen gives lower production rate and shorter average fiber length.

Example 2—Effect of One Refining Step, No Heat Treatment

To demonstrate the effect of knife milling of different cellulose sources without prior hammer-milling, the different pulp samples used in Example 1, in the form of pulp sheets cut to pieces of approximately 2×2 cm or manually disintegrated flash pulp, were knife milled according to the parameters sieve size and feed rate.

TABLE 3

Knife milling of samples without prior defiberizing in a hammer mill.

| Sample | Sieve size (μm) | Feed (g/h) | Production (g/h) | Fiber length (μm) | $d_{97}$ (μm) |
|---|---|---|---|---|---|
| (HW-D) | 100 | 600 | 334 | 239 | 78 |
| (HW-P-1) | 100 | 600 | 380 | 292 | 88 |
| (SW-P-Flash) | 100 | 600 | 370 | 266 | 78 |
| (SW-P-DM) | 100 | 600 | 281 | 269 | 79 |
| (HW-P-2) | 100 | 600 | 275 | 248 | 77 |

The results in Table 3 shows that all HW-pulps have almost the same production rate (96-97%) as hammer-milled fibers whereas SW pulp only came out at 69-78% of the production rate using hammer mill pre-milled starting materials. Also, the fiber lengths and d97-values are very similar which implies no need for pre-milling for HW-pulps (both production and fiber lengths similar with and without prior hammer milling). For SW-pulps the fiber lengths are similar but the production rate is lower if no pre-milling is done.

Example 3—Effect of Heat Treatment Prior to Knife Milling for HW-D

The effect of heat treatment, before and after cooling, was investigated using the experiments shown in Table 4. Pulp samples of hardwood dissolving pulp (HW-D), were cut into approximately 2×2 cm pieces and heat treated in hot and dry air for 15 minutes and 1 hour respectively. The samples were either allowed to cool to room temperature or were as quickly as possible fed into a knife mill for refining. In the latter case, smaller portions of pulp pieces were taken out from the heat and fed to the knife mill to minimize cooling of the samples. The temperatures investigated were 160° C. and 200° C. respectively. One possible negative side-effect of heat treatment may be a loss of brightness by formation of thermal degradation products. This might be problematic for end products in terms of esthetics, smell, and taste. To evaluate this, the change in reflectance at 457 nm under illuminant C was measured using a Minolta Spectrophotometer (CM-3630) according to SS-ISO 2470-1, directly on drying machine pulp sheets treated at the same time as the samples used for milling. The dry content of the starting materials were above 89%.

TABLE 4

Samples produced from using heat treatments prior to milling for 15 or 60 minutes. The samples were milled hot (HOT) or after cooling to room temperature (COLD). All samples were produced using a 100 μm sieve and with a feed rate of 600 g/h.

| Pulp | Temperature (° C.) | Time (min) | PC-number[1] | Milling | Production (g/h) | Fiber length (μm) | $d_{97}$ (μm) |
|---|---|---|---|---|---|---|---|
| HW-D | 200 | 15 | 0.93 | HOT | 413 | 254 | 93 |
| | | | | COLD | 359 | 257 | 89 |
| | | 60 | 21.4 | HOT | 485 | 240 | 92 |
| | | | | COLD | 397 | 243 | 87 |
| | 160 | 15 | 0.064 | HOT | 374 | 252 | 79 |
| | | | | COLD | 364 | 241 | 78 |
| | | 60 | 0.40 | HOT | 402 | 227 | 80 |
| | | | | COLD | 378 | 243 | 82 |

[1]Since brightness (reflectance at 457 nm, R∞) is not linearly correlated to the chromophore content, it is more helpful when comparing temperatures and times in relation to chromophore formation to look at the post color number (PC-number).

The PC-number is the difference between the ratios of the light absorption coefficient (k) and the light scattering coefficient (s), i.e. PC-number$=100\times[(k/s)_t-(k/s)_{t=0}]$.

The ratio may for each sample be approximated from the reflectance using the Kubelka-Munk relation: $k/s=(1-R_\infty)^2/(2R_\infty)$.

The results in Table 4 should be compared with knife milled HW-D, in Table 3, having an average fiber length of 239 μm, d97=78 μm, and a production rate of 334 g/h. The results show that the production rate was increased by 24% and 45% by heat treatment at 200° C. for 15 and 60 minutes respectively, if milled in this hot state at a very similar or nearly identical mean fiber length, compared to samples not being heat treated.

After cooling, the effect was lower but still the production rate was improved by 8% and 19% respectively (15 and 60 min). The brightness loss was profound for the treatment at 200° C. for 60 minutes which might be fine for some products but not for others. Therefore, treatment at lower temperatures was tested. As may be seen in Table 4, treatment at 60 minutes at 160° C. gave the same production increase as 15 minutes at 200° C. but at an even lower PC-number. This shows that longer time at a lower temperature that does not cause the same discoloration may be used for products sensitive to brightness. A high purity dissolving pulp is also less prone to discoloration than any of the hemicellulose-rich paper pulps.

Heat-treatments like this may be achieved by over-drying in a pulp drying machine or preferably using a flash drying unit. In normal pulp production, this over-drying is carefully avoided due to energy costs and possible negative effects on quality as mentioned above. For applications not sensitive to color the whole benefit of high temperatures and longer treatment times may be used. For applications where brightness is important shorter times and/or lower temperatures may be used.

Example 4—Effect of Heat Treatment Prior to Knife Milling for SW-P-DM and HW-P-1

As a follow-up to the experiments in Example 3 using HW-D, also the paper pulp, HW-P-1, and the softwood paper pulp dried on a drying machine (SW-P-DM) were heated and milled in the hot state. The dry content of the starting materials were above 89%.

The production, average fiber length and PC-number due to heating were recorded (Table 5).

| Pulp | Temperature (° C.) | Time (min) | PC-number[1] | Milling | Production increase (%)[2] | Relative fiber length (%)[3] |
|---|---|---|---|---|---|---|
| SW-P-DM | 160 | 60 | 2.3 | HOT | 8 | 102 |
| HW-P-1 | 160 | 60 | 4.7 | HOT | 16 | 88 |

[1]Since brightness (reflectance at 457 nm, R∞) is not linearly correlated to the chromophore content, it is more helpful when comparing temperatures and times in relation to chromophore formation to look at the post color number (PC-number). The PC-number is the difference between the ratios of the light absorption coefficient (k) and the light scattering coefficient (s), i.e. PC-number = $100\times[(k/s)_t-(k/s)_{t=0}]$ The ratio may for each sample be approximated from the reflectance using the Kubelka-Munk relation: k/s = (1 − R∞)2/(2R∞).

[2]Compared to reference milling without heat treatment

[3]Fiber length in % compared to reference milling without heat treatment

The efficiency of the heat treatment on production rate was almost as big for HW-P-1 as for the hardwood dissolving pulp (16% vs. 19%) but the brightness decrease was much larger for the paper pulp (compare the PC-numbers). The same is true for the softwood paper pulp but in this case the heat treatment gave only production increase of 8% at a very large discoloration. The average fiber lengths were the same (softwood paper pulp) or even lower (HW-P-1) than the references for each pulp. This means that the hardwood dissolving pulp (HW-D) shows a higher response to heating on production rate at a given time but also that the lower sensitivity to brightness loss shown by (HW-D) allows the heat treatment to be extended to a longer period (for any given limited brightness loss) making the difference even larger. Alternatively, a higher temperature may be used which makes the process concept less demanding (shorter times and possibly lower cost of treatment).

The skilled person realizes that a number of modifications of the embodiments described herein are possible without departing from the scope of the disclosure, which is defined in the appended claims.

The invention claimed is:

1. A method for producing powdered cellulose, wherein the method comprises the steps of:

a) providing dry pulp starting material;

b) heat treating the dry pulp starting material to a temperature of 100-250° C., for less than 1 hour; and c) refining the heat-treated dry pulp starting material to particles having a particle size of d97<500 μm.

2. The method for producing powdered cellulose according to claim 1, wherein the heat treatment of step b) is performed for at least 5 minutes, at least 10 minutes, or at least 15 minutes.

3. The method for producing powdered cellulose according to claim 1, wherein the refining of step c) is performed at a pressure below atmospheric pressure.

4. The method for producing powdered cellulose according to claim 1, wherein step b) is performed to a post color (PC)-number below 5, the PC-number being defined by the formulas:

PC-number$=100\times[(k/s)_t-(k/s)_{t=0}]$ $k/s=(1-R_\infty)^2/(2R_\infty)$ wherein R∞ is the measured diffuse reflectance at 457 nm.

5. The method for producing powdered cellulose according to claim 1, wherein the refining of step c) is performed in at least one of a hammer mill, a ball mill, a stone mill, an impact mill, and a knife mill.

6. The method for producing powdered cellulose according to claim 1, wherein the refining of step c) is performed in at least two refining steps, comprising a first refining to a particle size of d97<2000 μm, and a second refining to a particle size of d97<400 μm.

7. The method for producing powdered cellulose according to claim 6, wherein the first refining is performed in a hammer mill, an impact mill, a knife mill or air jet mill, and the second refining is performed in a ball mill, a stone mill, an impact mill, or a knife mill.

8. The method for producing powdered cellulose according to claim 1, wherein the dry pulp starting material comprises softwood Kraft paper pulp, hardwood Kraft paper pulp, hardwood sulphite pulp, softwood sulphite pulp, mechanical pulp (MP), softwood dissolving pulp, hardwood dissolving pulp, or mixtures thereof.

9. The method for producing powdered cellulose according to claim 1, wherein the dry pulp starting material comprises flash-dried pulp.

10. The method for producing powdered cellulose according to claim 1, wherein the dry pulp starting material comprises dissolving pulp.

11. The method for producing powdered cellulose according to claim 1, wherein the refining of step c) is performed to a particle size of d97<300 μm.

12. The method for producing powdered cellulose according to claim 1, further comprising a step of maintaining the heat-treated dry pulp starting material without intermediate cooling until the refining of step c).

13. A product obtained by the process according to claim 1, wherein said product has a microbe content below 14 000 cfu/g, 12 000 cfu/g, 10 000 cfu/g, 5 000 cfu/g, 2 000 cfu/g, or 1 000 cfu/g.

14. The product according to claim 13, wherein the dry pulp starting material comprises dissolving pulp.

15. The product according to claim 13, wherein the dry pulp starting material comprises flash-dried pulp.

16. A method of increasing the fiber content within a food product, within a feed product, or within a pharmaceutical product, the method comprising incorporating the product according to claim 13 into the food product, the feed product, or the pharmaceutical product.

* * * * *